United States Patent
Tava (10) Patent No.: US 9,952,055 B2
(45) Date of Patent: Apr. 24, 2018

(54) METHOD FOR DETERMINING CORRECTION VALUES FOR A ROUTE CALCULATION ALGORITHM

(71) Applicant: Bayerische Motoren Werke Aktiengesellschaft, Munich (DE)

(72) Inventor: Marcello Tava, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 145 days.

(21) Appl. No.: 14/973,868

(22) Filed: Dec. 18, 2015

(65) Prior Publication Data

US 2016/0102990 A1    Apr. 14, 2016

Related U.S. Application Data

(63) Continuation of application No. PCT/EP2014/060907, filed on May 27, 2014.

(30) Foreign Application Priority Data

Jun. 20, 2013 (DE) ................. 10 2013 211 605

(51) Int. Cl.
*G01C 21/34* (2006.01)
*G08G 1/123* (2006.01)

(52) U.S. Cl.
CPC ........ *G01C 21/34* (2013.01); *G01C 21/3446* (2013.01)

(58) Field of Classification Search
CPC ................. G01C 21/34; G01C 21/3446
(Continued)

(56) References Cited

U.S. PATENT DOCUMENTS 5,684,704 A * 11/1997 Okazaki ............ G01C 21/3446
701/25
2006/0047421 A1 3/2006 Goldberg et al.
(Continued)

FOREIGN PATENT DOCUMENTS

DE 195 47 253 A1 8/1996
DE 10 2008 027 957 A1 10/2009
(Continued)

OTHER PUBLICATIONS

International Search Report (PCT/ISA/210) issued in PCT Application No. PCT/EP2014/060907 dated Sep. 22, 2014 with English translation (five pages).

(Continued)

*Primary Examiner* — Aaron L Troost
*Assistant Examiner* — Paula L Schneider
(74) *Attorney, Agent, or Firm* — Crowell & Moring LLP (57) ABSTRACT

A predefined area is divided into a plurality of tiles, a respective one of the tiles of the area being determined as a starting tile and the respective remaining tiles being determined as reference tiles, and special nodes, being predefined that are arranged in the starting tile or in the respective reference tile. For the respective starting tile, a correction value is determined, in each case in relation to one of the reference tiles, such that a respective cost ratio is determined for each special node of the respective starting tile in relation to each special node of the reference tile on the basis of the edge costs of the connections that are situated between the respective special node of the starting tile and the respective special node of the reference tile. The cost ratio is also determined on the basis of a heuristic value of the respective special node of the starting tile in relation to the respective special node of the reference tile. A mean value is determined on the basis of the determined cost ratios. The mean (Continued)

value is taken as a basis for determining the correction value of the starting tile in relation to the respective reference tile.

10 Claims, 9 Drawing Sheets

(58) Field of Classification Search
USPC .......................................................... 701/533
See application file for complete search history.

(56) References Cited

U.S. PATENT DOCUMENTS

| | | |
|---|---|---|
| 2008/0147473 A1 | 6/2008 | Zhong et al. |
| 2009/0234569 A1* | 9/2009 | Jansen ............... G01C 21/3446 701/532 |
| 2011/0113155 A1 | 5/2011 | Kuznetsov et al. |
| 2011/0288762 A1 | 11/2011 | Kuznetsov |
| 2012/0029804 A1 | 2/2012 | White et al. |

FOREIGN PATENT DOCUMENTS

| | | |
|---|---|---|
| DE | 10 2010 040 730 A1 | 2/2012 |
| EP | 0 369 539 A1 | 5/1990 |
| EP | 0 790 486 A2 | 8/1997 |

OTHER PUBLICATIONS

German Search Report issued in counterpart German Application No. 10 2013 211 605.5 dated Nov. 18, 2013 with partial English translation (10 pages).

* cited by examiner

Prior Art

Figure 6B

Prior Art

Figure 6C

Prior Art

METHOD FOR DETERMINING CORRECTION VALUES FOR A ROUTE CALCULATION ALGORITHM

CROSS REFERENCE TO RELATED APPLICATIONS

This application is a continuation of PCT International Application No. PCT/EP2014/060907, filed May 27, 2014, which claims priority under 35 U.S.C. § 119 from German Patent Application No. 10 2013 211 605.5, filed Jun. 20, 2013, the entire disclosures of which are herein expressly incorporated by reference.

This application contains subject matter related to U.S. application Ser. No. 14/973,851, entitled "Method and Apparatus for Determining a Route and Correction Values for Heuristic Values" filed on even date herewith.

BACKGROUND AND SUMMARY OF THE INVENTION

The invention relates to a method and an apparatus for determining a route for a navigation system and/or a driver assistance system. The invention also relates to a method for determining correction values for a route calculation algorithm and to a system and a computer program product.

In vehicle navigation systems, the so-called A* algorithm is used in many cases to calculate the route. This algorithm is used to calculate a shortest path between a starting node and one or more arbitrary nodes in a graph with a positive edge weight. In graph theory, a graph is a set of points, the points partially being connected to one another by means of so-called edges. The points are also called nodes. The edges are also referred to as lines or connections. The shape of the points and edges does not play a role in graph theory. In graph theory, a real number assigned to the respective edge is referred to as the edge weight. The real number may represent, for example, a distance, a time period or a gasoline consumption.

The A* algorithm uses an estimation function (heuristics) in order to search in a targeted manner and therefore to reduce the run-time. However, if the estimation function does not represent the real route and/or path conditions in an area with sufficient accuracy, the calculation of the optimum route may take a very long time.

The object on which the invention is based is to provide a method and an apparatus for determining a route, a method for determining correction values for a route calculation algorithm and a system and a computer program product which contribute to increasing efficiency of the route determination, in particular accelerating the route determination.

According to a first aspect of the invention, a method is provided for determining correction values for a route calculation algorithm on the basis of digital map data for a route network and/or a path network in a predefined area. In this case, the digital map data include respective nodes in the area and connections between the respective nodes in the area. The digital map data also include respective edge costs for the respective connections between the nodes. The area is subdivided, in a predefined manner, into a plurality of tiles, for which correction values are determined. One of the tiles in the area is respectively determined as the starting tile and the respective remaining tiles are determined as reference tiles. Special nodes are predefined, which special nodes are arranged in the starting tile and form a true or artificial subset of all nodes in the starting tile, and special nodes being predefined, which special nodes are arranged in the respective reference tile and form a true or artificial subset of all nodes in the respective reference tile. A correction value is determined for the respective starting tile with respect to one of the reference tiles in each case in such a manner that a cost ratio is respectively determined for each special node in the respective starting tile with respect to each special node in the reference tile on the basis of the edge costs of the connections which lie between the respective special node in the starting tile and the respective special node in the reference tile and represent an optimum route between the respective special node in the starting tile and the respective special node in the reference tile. The cost ratio is also determined on the basis of a heuristic value for the respective special node in the starting tile with respect to the respective special node in the reference tile. A mean value is determined on the basis of the determined cost ratios. The correction value for the starting tile is determined with respect to the respective reference tile on the basis of the mean value.

Predefining the special nodes in the respective starting tile and the special nodes in the respective reference tile means that the number of correction values to be calculated remains within limits but it is possible to ensure at the same time that sufficient statistical relevance or accuracy of the correction values can be ensured. This advantageously makes it possible to determine the correction values with sufficient accuracy, with the result that subsequent route determination can be carried out more efficiently. The special nodes can be selected in a predefined manner, in particular. These selected nodes can be selected, for example, stochastically and/or on the basis of at least one predefined rule.

The correction values can be advantageously determined independently of current route determination, for example during map compiling.

The respective cost ratio is a direct measure of a discrepancy between the heuristic value for the respective special node in the starting tile with respect to the respective special node in the reference tile and the sum of the edge costs of an optimum route from the respective special node in the starting tile to the respective special node in the reference tile.

Depending on requirements, a different number of special nodes can respectively be selected for the starting tile and/or the respective reference tiles. An additionally required need for storage space for storing the correction values can therefore be kept suitably low.

In this case, the mean value is based on a calculation rule which is used to calculate a further number from two or more numbers, which further number lies between the given numbers.

The edge costs and the estimated costs have a predefined correspondence. The edge costs represent a value of a weighting function. The weighting function weights respective individual edge costs of the respective connection, for example route length costs and/or journey time costs, in a predefined manner. The estimated costs represent the value of an estimation function which weights estimated individual costs in a predefined manner similar to the weighting function. The optimum route is optimum with respect to the edge costs.

The heuristic value is determined using an estimation function which is also called heuristics. The estimation function may include, for example, a function for determining a shortest distance between two points in a predefined two-dimensional coordinate system (Euclidean distance). The prerequisite for the A* algorithm is that the estimation function is permissible. The estimation function is permissible if the respective heuristic value does not exceed the respective sum of the edge costs of the connections of the optimum route between two nodes to be considered. That is to say, the respective heuristic value must always be in the range [0; w] if w respectively denotes the sum of the edge costs of the connections of the optimum route between the two nodes to be considered. The respective correction values can therefore be determined on the basis of adapted mean values if necessary, with the result that it can be ensured that the permissibility prerequisites of the A* algorithm are also complied with when using the correction values. For example, the respective mean values can be adapted by dividing them by a predefined factor which is greater than 1.

In one advantageous refinement of the first aspect of the invention, the digital map data include the respective positions of the nodes in the area. The heuristic value for the respective special node in the starting tile with respect to the respective special node in the reference tile is determined on the basis of the position of the respective special node in the starting tile and the position of the respective special node in the reference tile. This advantageously makes it possible to save storage capacity.

In another advantageous refinement of the first aspect of the invention, the digital map data includes predefined heuristic values for the respective nodes with respect to the respective other nodes in the area which each represent estimated costs from one node in each case to the other node in each case, and the heuristic value for the respective special node in the starting tile with respect to the respective special node in the reference tile is therefore predefined. This advantageously makes it possible to save computing capacity when calculating the correction values.

In another advantageous refinement of the first aspect of the invention, the heuristic value for the respective special node in the starting tile with respect to the respective special node in the reference tile represents the Euclidean distance between the respective special node in the starting tile and the respective special node in the reference tile. This makes it possible to easily determine the correction values.

In another advantageous refinement of the first aspect, the mean value of the cost ratios represents an arithmetic mean value of the cost ratios. This has the advantage that the respective correction values can be easily provided.

According to a second and a third aspect of the invention, a method and a corresponding apparatus for determining a route for a navigation system and/or a driver assistance system are provided. The navigation system and/or driver assistance system is assigned at least one storage unit for storing digital map data for a route network and/or path network in a predefined area. In this case, the digital map data include respective nodes in the area and connections between the respective nodes in the area. The digital map data also include respective edge costs for the respective connections between the nodes, and a set of correction values determined in accordance with the first aspect. The route from a predefined starting node to a predefined destination node is determined on the basis of a predefined route criterion and on the basis of the digital map data stored in the storage unit in such a manner that, for a possible expansion of a respective current node, total costs are determined for the current node on the basis of a sum of edge costs of an optimum route from the starting node to the current node and a destination-node-based heuristic value for the current node and a destination-node-based correction value. The destination-node-based heuristic value represents respectively estimated costs from the current node to the destination node. The destination-node-based correction value is selected from the set of correction values on the basis of the current node and the destination node.

Advantageous refinements of the first aspect of the invention also apply here to the second and third aspects.

The data relating to the determined route can be forwarded to the navigation system for optically and/or acoustically signaling the determined route, for example on a display, and/or for determining and outputting driving instructions. Additionally or alternatively, the data may be forwarded to the driver assistance system, the predefined driver assistance system being designed to control predefined vehicle functions of a vehicle on the basis of the determined data relating to the route.

The correction values are preferably determined in advance. The respective destination-node-based correction values are at least one subset of the stored correction values.

The respective destination-node-based heuristic value can be assessed, for example, using the destination-node-based correction value. For example, if the destination-node-based heuristic value does not represent the real route and/or path conditions in the area with sufficient accuracy, the destination-node-based heuristic value may have an excessively small value. This can be at least partially compensated for by means of the assessment using the destination-node-based correction value. In comparison with the determination of the route without correction values, the optimum route can be determined with considerably fewer calculation steps when using the correction values.

In this case, the optimum route is optimum with respect to the predefined route criterion. Expanding a node means that, starting from this node, the total costs of further nodes having a connection to this node are determined. The route can be determined, for example, according to an A* algorithm. In the A* algorithm, the node having the lowest total costs is respectively expanded next. For the decision regarding whether the current node is expanded in the next step, the total costs of the current node are determined and compared with the total costs of further possible expansion nodes.

The edge costs and the estimated costs have a predefined correspondence. The edge costs represent a value of a weighting function. The weighting function weights respective individual edge costs of the respective connection, for example route length costs and/or journey time costs, in a predefined manner. The estimated costs represent the value of an estimation function which weights estimated individual costs, for example estimated route length residual costs from a current node to the destination node and/or estimated journey time residual costs from the current node to the destination node, in a predefined manner similar to the weighting function. In a simplified case, the edge costs may represent, for example, the route length costs of the respective connection and the estimated costs may represent, for example, the estimated route length residual costs, for example the Euclidean distance, between the current node and the destination node.

In one advantageous refinement of the second and third aspects of the invention, the digital map data include the respective positions of the nodes in the area, and the destination-node-based heuristic value is determined on the basis of the position of the current node and the position of the destination node. A storage capacity of the storage unit can therefore be advantageously kept low.

In another advantageous refinement of the second and third aspects of the invention, the digital map data include predefined heuristic values for the respective nodes with respect to the respective other nodes in the area which each represent estimated costs from one node in each case to the other node in each case, and the destination-node-based heuristic value is therefore predefined. This advantageously makes it possible to save computing capacity since the destination-node-based heuristic values can be determined in advance and therefore independently of a current route calculation.

In another advantageous refinement of the second and third aspects of the invention, the respective destination-node-based heuristic value represents the Euclidean distance between the current node and the destination node. The destination-node-based heuristic values can therefore be advantageously determined in a very simple manner. Furthermore, the Euclidean distance to the destination is a monotonous estimation function (heuristics) and therefore complies with, in particular, the reliability prerequisite for the A* algorithm.

According to a fourth aspect of the invention, a system is provided which has a storage unit and an apparatus according to the third aspect and in which the storage unit stores digital map data for a route network and/or a path network in a predefined area. The apparatus is coupled to the storage unit using signaling and is designed to read the digital map data from the storage unit. In this case, the digital map data include respective nodes in the area and connections between the respective nodes in the area. The digital map data also include respective edge costs for the respective connections. Furthermore, the digital map data comprise a set of correction values determined in accordance with the first aspect.

Advantageous refinements of the first, second and third aspects of the invention also apply in this case to the fourth aspect of the invention.

According to a fifth aspect of the invention, a computer program product is provided comprising executable program code, the program code carrying out the steps of the method according to the first aspect during execution by a data processing apparatus. Advantageous refinements of the first aspect also apply in this case to the fifth aspect.

Other objects, advantages and novel features of the present invention will become apparent from the following detailed description of one or more preferred embodiments when considered in conjunction with the accompanying drawings.

DETAILED DESCRIPTION OF THE DRAWINGS

Elements with the same design or function are provided with the same reference symbols throughout the figures.

Figure 6A:
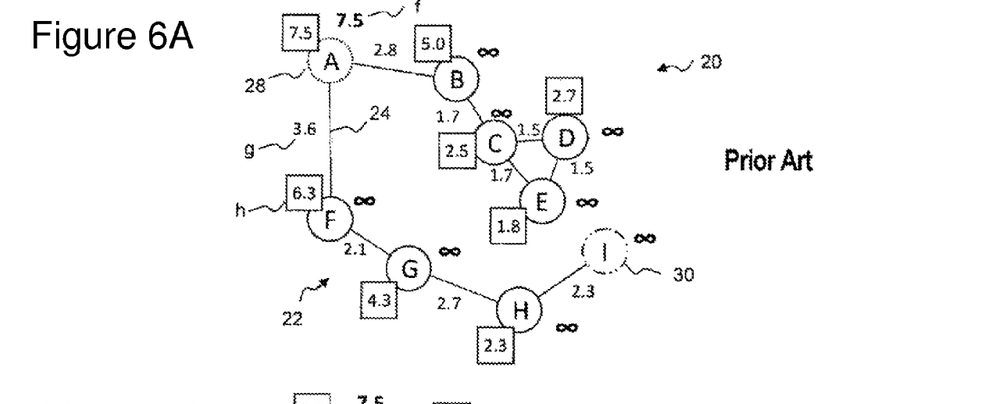
FIGS. 6A to 6C are diagrams illustrating the determination of a route using the A* algorithm according to the prior art.
Figure 6B:
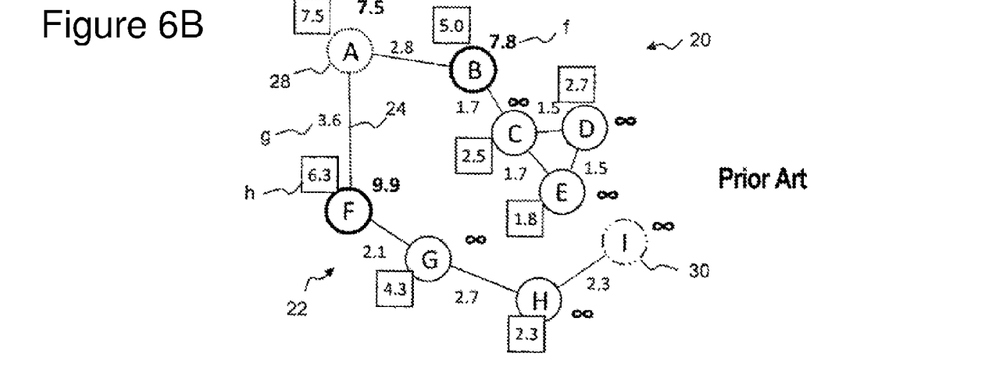
Figure 6C:
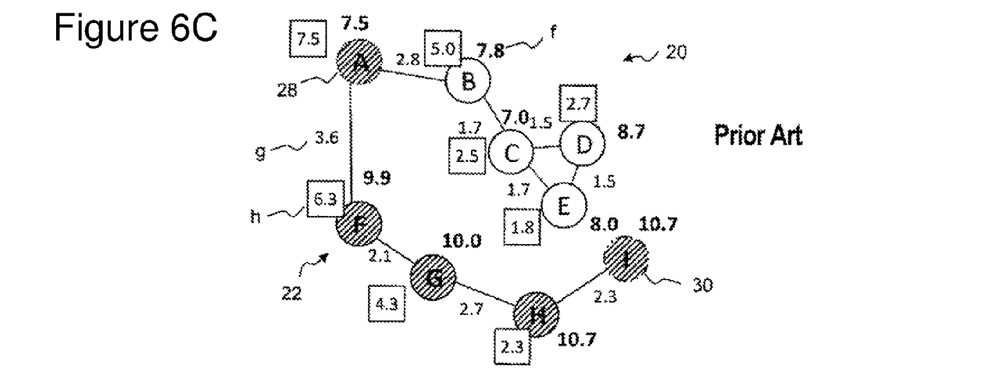

FIGS. 6A to 6C each show a graph 22 for a predefined area 20 for determining a route from a starting node 28 to a destination node 30. The graph 22 has nodes and edges which are also called connections 24. The diagrams shown in FIGS. 6A to 6C are used to illustrate the determination of an optimum route using the A* algorithm according to the prior art. In this case, the optimum route is optimum with respect to the edge costs g, for example the fastest, the shortest or the simplest.

In FIGS. 6A to 6C, names in the form of uppercase letters of the Latin alphabet are assigned to the nodes for easier distinction. The starting node 28 has the letter A and is also called the A node below. The destination node 30 has the letter I and is also called the I node below.

The numbers in normal print which are shown in FIGS. 6A to 6C and are arranged beside the connections 24 represent respective edge costs g, for example a route distance between the two nodes connected by the connection 24. A destination-node-based heuristic value h is assigned to each node in the graph 22. The destination-node-based heuristic value h represents estimated costs based on the respective node and the destination node 30.

In FIGS. 6A to 6C, the respective destination-node-based heuristic value h for the respective node is entered in a box beside the respective node. The destination-node-based heuristic values h shown in FIGS. 6A to 6C each represent the Euclidean distance from the respective node to the destination node 30.

In the case of the A* algorithm, the nodes which are likely to quickly lead to the destination node 30 are always investigated first. Starting from the starting node 28, total costs f are determined for the nodes which have a connection 24 to the starting node 28. In the example shown in FIG. 6B, these are the B node and the F node.

The node having the lowest total costs f is expanded next, that is to say, starting from this node, the total costs f of the nodes having a connection 24 to this node are determined.

In this case, the total costs f are the sum of the edge costs g of an optimum route from the starting node 28 to the current node 22a, also called cumulative edge costs below, plus the destination-node-based heuristic value h. The total costs can be determined according to the formula in equation 1:

$$f(x)=\text{cum}(x)+h(x) \quad \text{Equation 1,}$$

where cum(x) represents the cumulative edge costs and h(x) represents the destination-node-based heuristic value h for a node x.

Based on the starting node 28, the A node in this case, with the numerical values indicated by way of example in FIG. 6A, the following results for the total costs f for the B node:

$$f(B,I)=\text{cum}(A,B)+h(B,I)=g(A,B)+h(B,I)=2.8+5=7.8$$

and for the F node $$f(F,I)=\text{cum}(A,F)+h(F,I)=g(A,F)+h(F,I)=3.6+6.3=9.9.$$

In this case, g(x,y) represents the edge costs g of the node x based on its neighboring node y which is a direct precursor node based on the optimum route.

In this case, the B node has the lower total costs f and is therefore expanded next.

With the numerical values indicated by way of example in FIG. 6A, the following total costs f result for the C node:

$$f(C,I)=\text{cum}(A,C)+h(C,I)=g(A,B)+g(B,C)+h(C,I)=7.00$$

The total costs f for the respective node are each shown in bold beside the nodes in FIG. 6C. Nodes for which no total costs f have yet been determined are initially allocated the value infinite, as shown in FIGS. 6A and 6B.

As can be discerned from FIGS. 6A to 6C, neither the C node nor the D node nor the E node has a connection 24 to the destination node 30. In order to arrive at the I node from the E node, all nodes, the C, B, A, F, G and H nodes, must be passed through. Such a situation can occur, for example, if, in a real landscape area, a river, railroad tracks and/or another obstacle which cannot be overcome is/are situated between the E node and the I node. In this case, the selected heuristic function does not represent the real route and/or path conditions in the area 20 with sufficient accuracy and determination of the optimum route requires more computing steps and therefore takes longer.

In the situation shown in FIGS. 6A to 6C, the expansion is continued starting from the F node. The optimum route runs from the A node to the I node via the F, G and H nodes.

Figure 1:
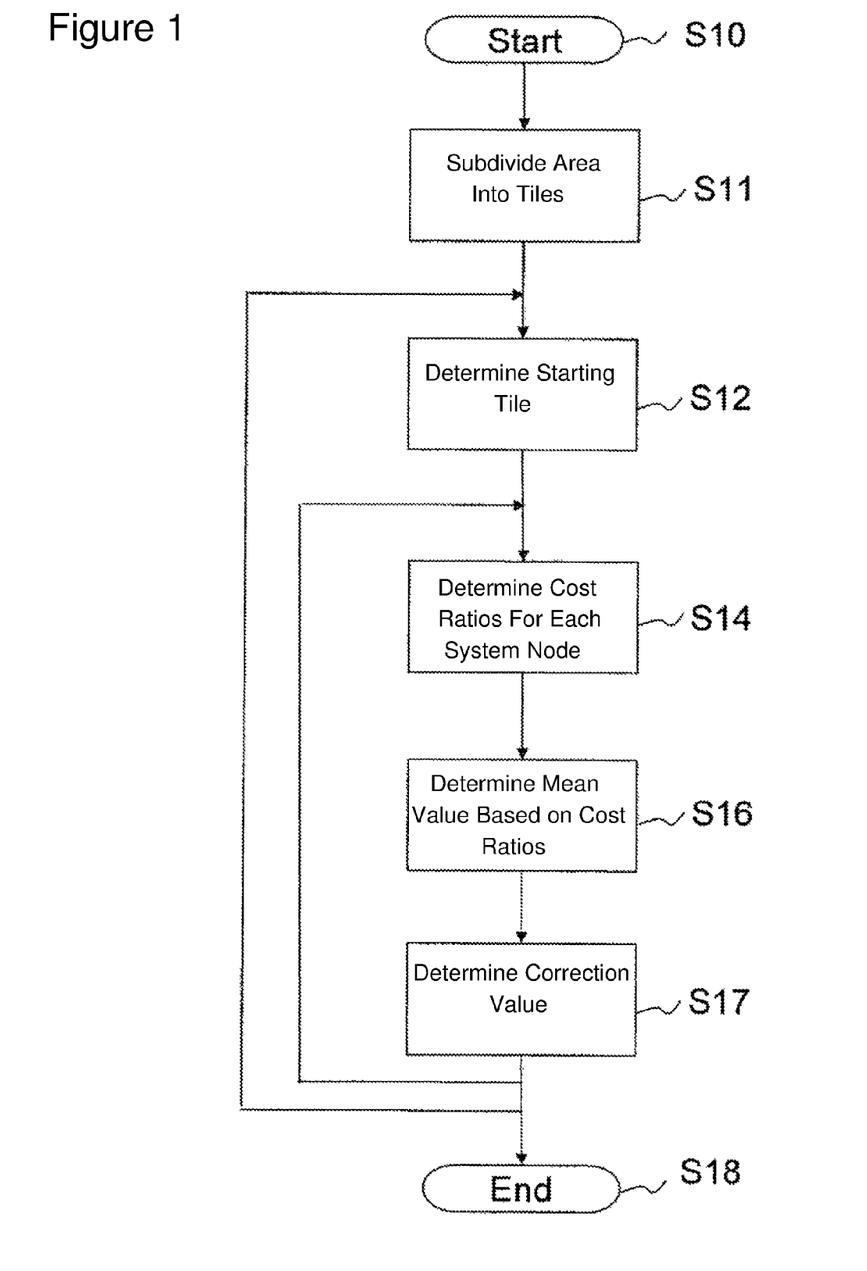
FIG. 1 is a flowchart for a first program for determining correction values for a route determination algorithm.

FIG. 1 shows an exemplary flowchart of a first program for determining correction values k which can be used for a route determination algorithm, for example for the A* algorithm. The first program is used to prepare and compile the digital map data and is preferably executed before delivery of a navigation device using these digital map data. The first program is executed, for example, on a stationary computing unit in the backend of a navigation device manufacturer, for example on a backend server.

Figure 2A:
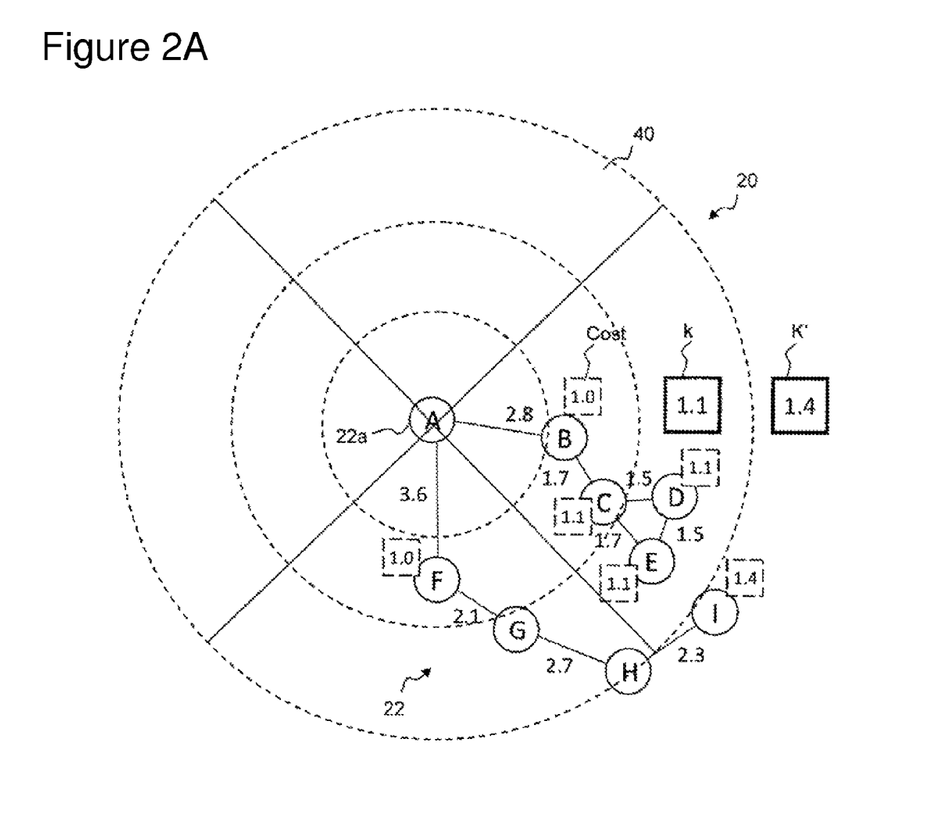
FIGS. 2A to 2C are diagrams illustrating the determination of correction values.
Figure 4:
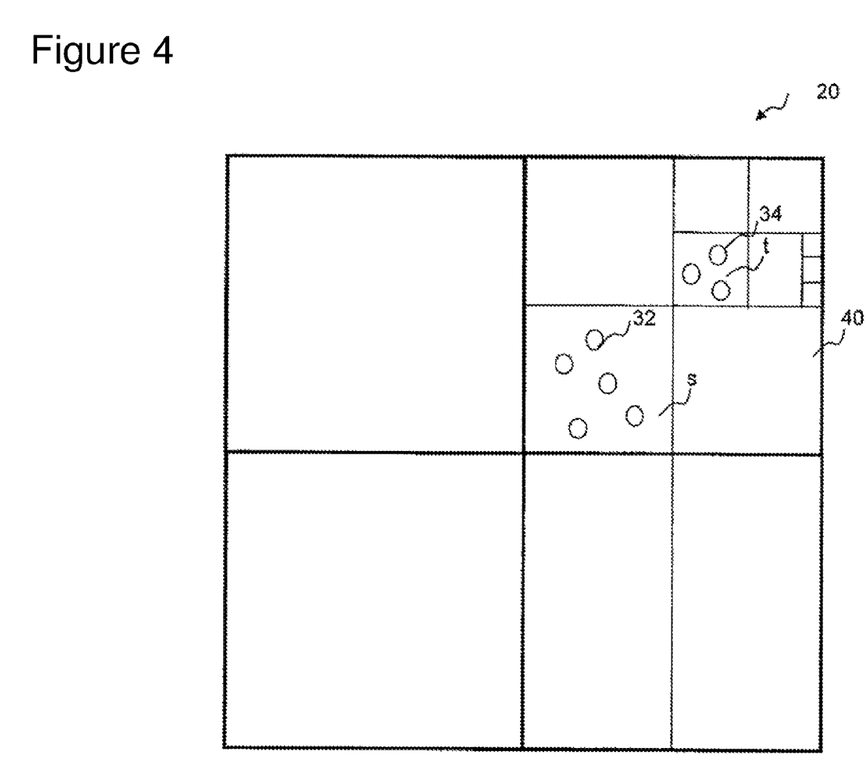
FIG. 4 is another exemplary embodiment for subdividing an area into segment regions.

The correction values k are determined on the basis of digital map data for a route network and/or path network in a predefined area 20 (FIG. 2A and FIG. 4). The digital map data include respective nodes in the area 20 and connections 24 between the respective nodes in the area 20. The digital map data also include respective edge costs g for the respective connections 24 between the nodes.

In the flowchart shown in FIG. 1, the first program is started in a step S10.

In a step S11, the area 20 is subdivided, in a predefined manner, into a plurality of tiles 40 (FIG. 2A and FIG. 4) representing geographical subareas of the area 20.

In a step S12, one of the tiles 40 is respectively determined as the starting tile. The remaining tiles 40 in the area each form reference tiles for this starting tile, special nodes 32 being predefined, which special nodes are arranged in the starting tile and form a true or artificial subset of all nodes in the starting tile, and special nodes 34 being predefined, which special nodes are arranged in the respective reference tile and form a true or artificial subset of all nodes in the respective reference tile.

The special nodes 32, 34 are selected, in a predefined manner, from all nodes in the starting tile or the reference tile, for example.

A correction value k is respectively determined for the respective starting tile with respect to the respective reference tiles. For this purpose, in a step S14, a cost ratio Cost is respectively determined for each special node 32 in the respective starting tiles with respect to each special node 34 in the respective reference tiles. The cost ratio (Cost) is determined on the basis of the edge costs g of the connections 24, which lie between the respective special node 32 in the respective starting tile and the respective special node 34 in the respective reference tile and represent an optimum route between the special node 32 in the respective starting tile and the special node 34 in the respective reference tile, and a heuristic value for the special node 32 in the respective starting tile with respect to the special node 34 in the respective reference tile.

In this case, the digital map data include, for example, the respective positions of the nodes in the area 20, and the heuristic value for the respective special node 32 in the respective starting tile with respect to the respective special node 34 in the respective reference tile is determined on the basis of the position of the respective special node 32 in the respective starting tile and the position of the respective special node 34 in the respective reference tile. In this case, the heuristic value for the respective special node 32 in the respective starting tile with respect to the respective special node 34 in the respective reference tile represents, for example, the Euclidean distance between the respective special node 32 in the respective starting tile and the respective special node 34 in the respective reference tile.

In a step S16, a mean value is determined on the basis of the determined cost ratios Cost.

In a step S17, the correction value k is determined on the basis of the determined cost ratios Cost. In this case, the mean value may be directly assigned to the correction value k or the mean value can be divided by a factor greater than one and can then be assigned to the correction value k.

Starting from step S17, the first program is continued in step S14 for a further reference tile for the respective starting tile until the correction values k have been determined for all reference tiles for the respective starting tile.

If the calculation of the correction values k for the respective starting tile has been concluded, the first program is run through again starting from step S12 for a further one of the starting tiles which still remain.

The first program is ended in a step S18 if the correction values k have been determined for all starting tiles.

The individual program steps can alternatively also be carried out at least partially in an order other than that indicated in FIG. 1.

The correction values k can be advantageously determined independently of current route determination. The determination of the correction values k can be carried out once provided that no major changes occur with respect to the nodes and connections 24 in the predefined area 20. This has the advantage, in particular, that very powerful computing units can be used for determination. For example, a compiler can be used to read in raw data relating to the road network and/or the path network in the area 20 and to select the data relevant to a predefined navigation system and/or driver assistance system and to calculate the correction values k and to suitably combine these data in a compiled database and to store these data.

Figure 2B:
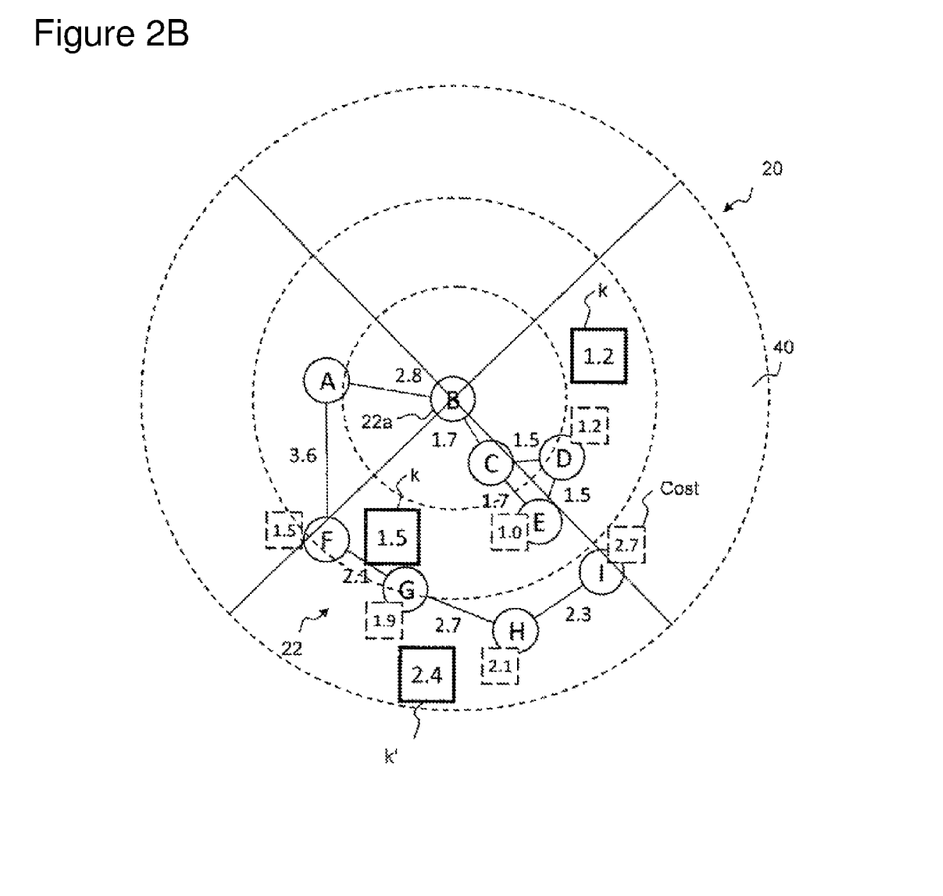
Figure 2C:
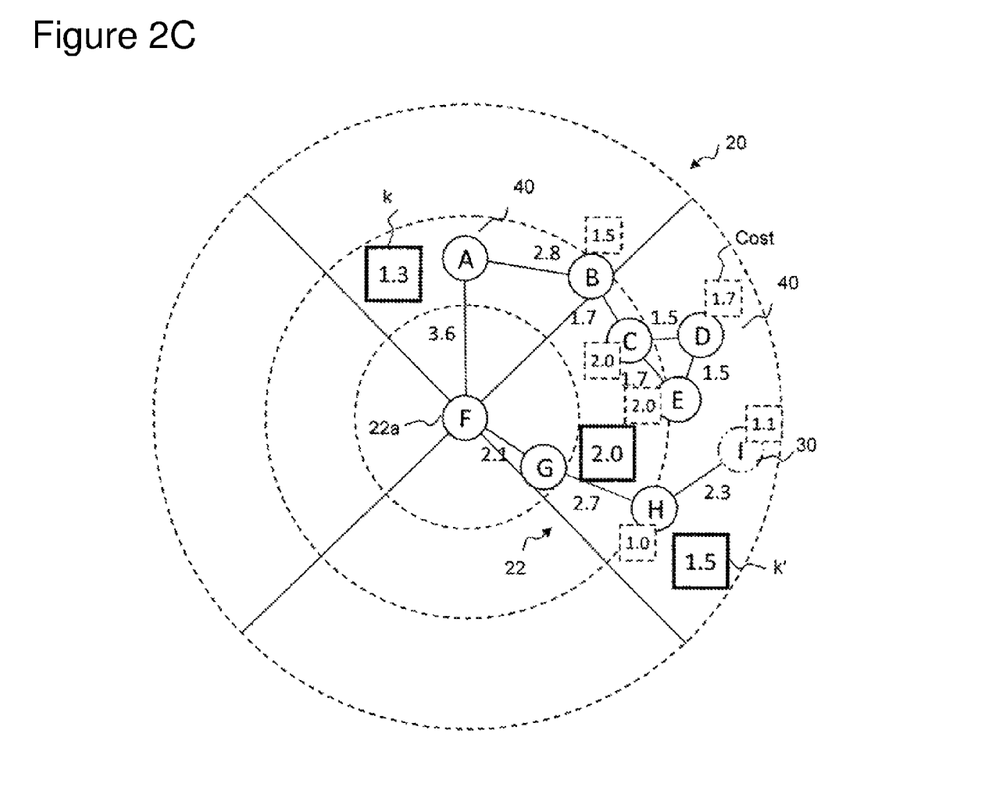

The diagrams shown in FIGS. 2A to 2C illustrate, by way of example, the determination of the correction values k. The graphs 22 shown in FIGS. 6A to 6C are the starting point here. In this case, the graphs 22 each represent, by way of example, the route network and/or path network in the predefined area 20.

In this case, FIG. 2A illustrates, by way of example, the predefinition of the reference tiles for the starting tile which comprises the A node, FIG. 2B illustrates the predefinition of the reference tiles for the starting tile which comprises the B node, and FIG. 2C illustrates the predefinition of the reference tiles for the starting tile which comprises the F node.

In the exemplary embodiments shown in FIGS. 2A to 2C, the tiles 40 are segment regions each comprising a predefined radius region starting from the starting tile for which the correction values k are determined, and a predefined angle region around the starting tile. The area 20 is therefore subdivided into concentric circular segments based on the starting tile.

The subdivision of the area 20 into segment regions, as shown in FIGS. 2A to 2C, is one possible exemplary embodiment. In particular, the number of segment regions and their size may be selected differently with respect to the respective angle region and the respective radius region, for example on the basis of a possible storage capacity of a storage unit for storing the digital map data, for example a database for the navigation system, and/or on the basis of a number of accesses to such a storage unit and on the basis of the demands imposed on the reliability and efficiency of the route determination algorithm.

The diagrams shown in FIGS. 2A to 2C illustrate, by way of example, the determination of the correction values k for the special situation in which the starting tile respectively comprises only one special node 32.

Figure 3A:
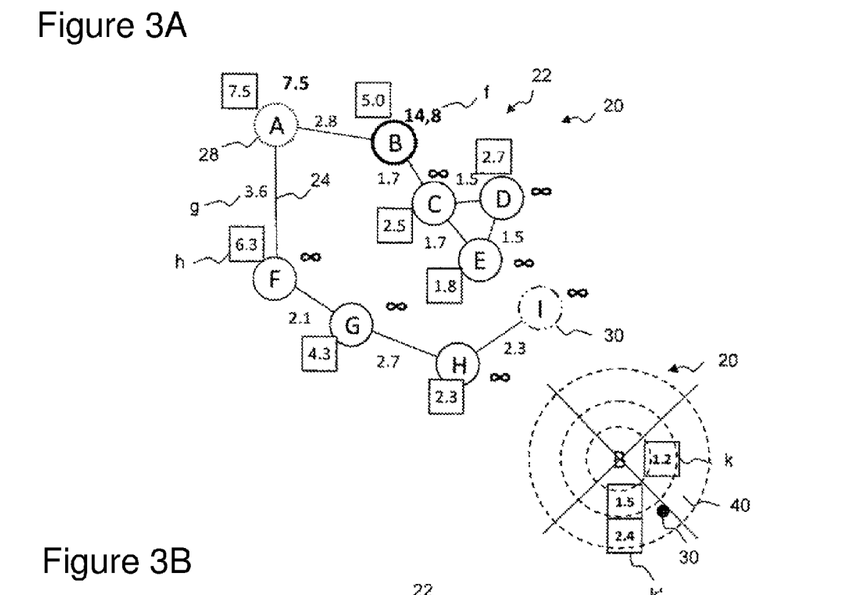
FIGS. 3A to 3C are diagrams illustrating the determination of a route with the aid of the correction values.
Figure 3B:
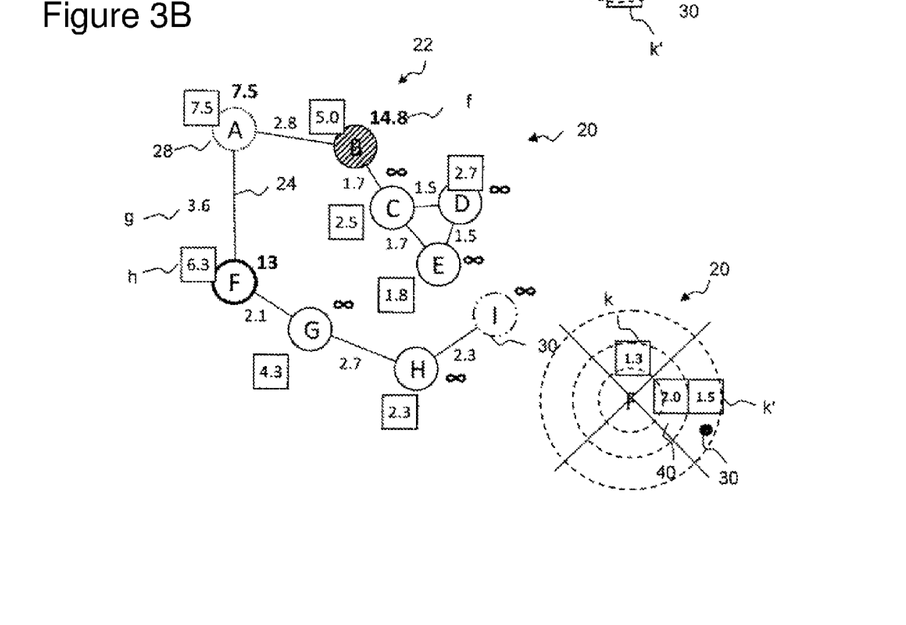

With the numbers from FIG. 6B (heuristic value h) and FIG. 3B (edge costs g), the following cost ratio Cost results for the B node based on the I node:

$$\begin{aligned}\text{Cost}(B, I) &= \text{cum}(B, I)/h(B/I) && \text{Equation 1}\\ &= (g(A, B) + g(A, F) + g(F, G) + g(G, H) +\\ &\quad g(H, I)/h(B, I)\\ &= (2.8 + 3.6 + 2.1 + 2.7 + 2.3)/5.0\\ &= 2.7,\end{aligned}$$

where cum(B,I) represents the sum of the edge costs g of an optimum route from the B node to the I node.

The correction value k for the reference tile comprising the I node represents the mean value of all cost ratios Cost for this reference tile. In the example shown in FIG. 2B, the correction value k for the reference tile comprising the I node is equal to:

$$\begin{aligned}k(B, \{H, I\}) &= (\text{Cost}(B, H) + \text{Cost}(B, I)/2 && \text{Equation 2}\\ &= (2.1 + 2.7)/2\\ &= 2.4.\end{aligned}$$

For a further reference tile comprising the F, G and E nodes, the correction value k is equal to:

$$\begin{aligned}k(B, \{F, G, E\}) &= (\text{Cost}(B, F) + \text{Cost}(B, G) + \text{Cost}(B, E))/3\\ &= (1.5 + 1.9 + 1.0)/3\\ &= 1.5.\end{aligned}$$

In FIGS. 2A to 2C, the cost ratios Cost of the individual nodes are indicated in the small boxes with a dashed edge and the respective correction values k are indicated in the large boxes with a bold edge.

The correction values k for the other nodes can be determined in a similar manner.

Figure 3C:
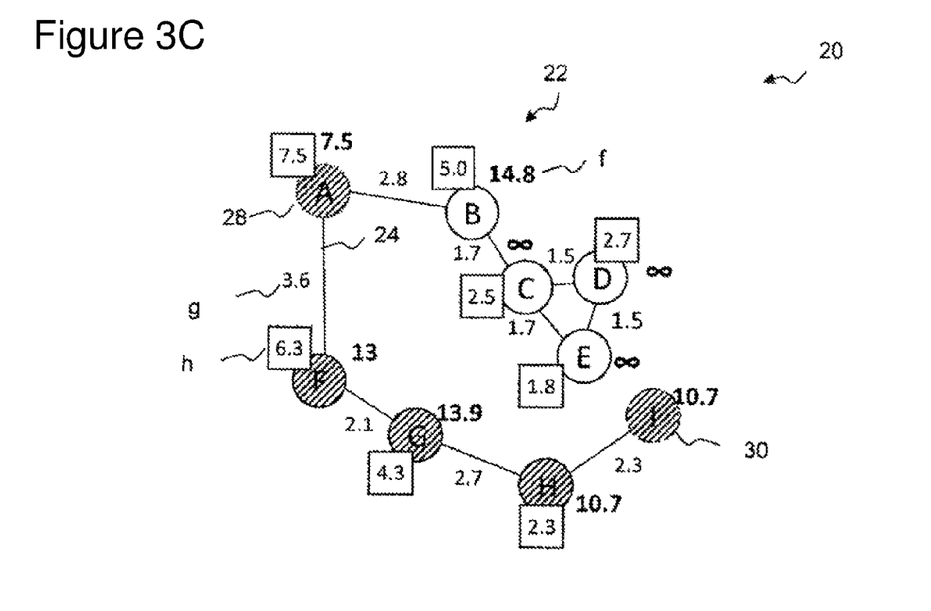

The diagrams shown in FIGS. 3A to 3C illustrate the determination of the route on the basis of the correction values k.

The route can be determined using a suitable second program on the basis of digital map data including the data which are also used to calculate the correction values k and include the determined correction values k.

The second program can be executed by a suitable computing unit having a program memory. This computing unit can also be called an apparatus for determining a route and/or a route determination device. The second program is preferably executed by a navigation device during current route calculation by the navigation device.

In this case, the route from a predefined starting node 28 to a predefined destination node 30 is determined in such a manner that, for a possible expansion of a respective current node 22a, the total costs f for the current node 22a are determined on the basis of the sum of the edge costs g of the optimum route from the starting node 28 to the current node 22a and the predefined destination-node-based heuristic value h for the current node 22a and a stored destination-node-based correction value k' which was determined using the first program for the starting tile, which includes the current node 22a, based on the reference tile, which includes the destination node.

The total costs f for the node x can be calculated according to equation 3:

$$f(x) = \text{cum}(x) + h(x) * k'(x) \qquad \text{Equation 3}$$

In this case, k'(x) is the correction value based on the destination node.

The following total costs f result for the B node based on the destination node 30 according to equation 3:

$$\begin{aligned}f(B, I) &= \text{cum}(B, I) + h(B, I) * k'(B, \{H, I\})\\ &= g(A, B) + h(B, I) * k'(B, \{H, I\})\\ &= 2.8 + 5 * 2.4\\ &= 14.8.\end{aligned}$$

The following total costs f result for the F node based on the destination node 30 according to equation 3:

$$\begin{aligned}f(F, I) &= \text{cum}(F, I) + h(F, I) * k'(F, \{H, E, D, I\})\\ &= g(A, F) + h(F, I) * k'(F, \{H, E, D, I\})\\ &= 3.6 + 6.3 * 1.5\\ &= 13.1.\end{aligned}$$

In this case, the F node has the lower total costs f and is therefore expanded next.

The total costs f for the respective node are shown in bold in each case beside the node in FIG. 3C.

The optimum route runs from the A node to the I node via the F, G and H nodes. In comparison with the determination of the route without correction values k, the optimum route is determined in this case with considerably fewer calculation steps.

The area 20 can also be alternatively subdivided into tiles 40 along Cartesian coordinates, as shown in FIG. 4, for example.

The tiles 40 may have different sizes; for example, the tiles 40 in urban areas with a high road density may be selected to be smaller than in rural areas with a relatively low road density.

For example, the predefined area 20 is subdivided into M tiles 40, as shown in FIG. 4. The number of nodes in each of the tiles 40 is Ni with i=1 to M in each case.

A vector, vi with i=1 to M, is also defined, which vector stipulates the number, ni with i=1 to M, of special nodes 32, 34 in the respective tiles 40 which are needed to calculate the costs according to the rule:

$$n_i = \max[\text{floor}(N_i q_i); 1] \qquad \text{Equation 4}$$

with $0 \leq q_i \leq 1$, where the floor function assigns the next smaller integer to a real number.

The respective special nodes 32, 34 are preferably selected, in a predefined manner, from the set of all nodes in the respective tile 40. This can be carried out using predefined rules which produce a distribution of the selected special nodes 32, 34 as homogeneously as possible from a geographical or geometrical point of view.

For the example shown in FIG. 4, the correction values k for the A* heuristics are calculated as follows:

$$k_{s,t} = \frac{\sum_{\substack{i=1,n_s \\ j=1,n_t}} \left[\frac{R(P_{s,i}; P_{t,j})}{d(P_{s,i}; P_{t,j})}\right]}{n_s n_t} \quad \text{Equation 5}$$

where
- $k_s, t$ is the correction value for a route between a first tile s and a second tile t,
- R is a function for calculating the route costs between two nodes,
- d is a function for calculating the Euclidean distance between two nodes,
- $P_{s,i}$ is the ith node from the first tile s,
- $P_{t,i}$ is the ith node from the second tile t,
- $n_s$ is the number of special nodes 32 in the first tile s,
- $n_t$ is the number of special nodes 34 in the second tile t.

In this case, the first tile s represents the starting tile and the second tile t represents one of the reference tiles.

The correction values k can be efficiently stored in the form of a matrix in a database containing the correction values k from any desired tile 40 to any desired further tile 40.

$$K = \begin{bmatrix} k_{11} & \ldots & k_{1m} \\ \ldots & \ldots & \ldots \\ k_{M1} & \ldots & k_{MM} \end{bmatrix}$$

The diagonal elements in the matrix K have the value one.

In order to calculate the route, all nodes arranged in one of the starting tiles are assigned the correction values k which have been determined for this starting tile.

A route from node X to the node Y is then calculated with the following steps, for example:

A first tile in which the node X is arranged is determined.
A second tile in which the node Y is arranged is determined.
The correction value k which has been determined for the first tile with respect to the second tile is read from the database.
The correction value k is used with the A* algorithm, as described above in connection with FIGS. 3A to 3C.

Figure 5:
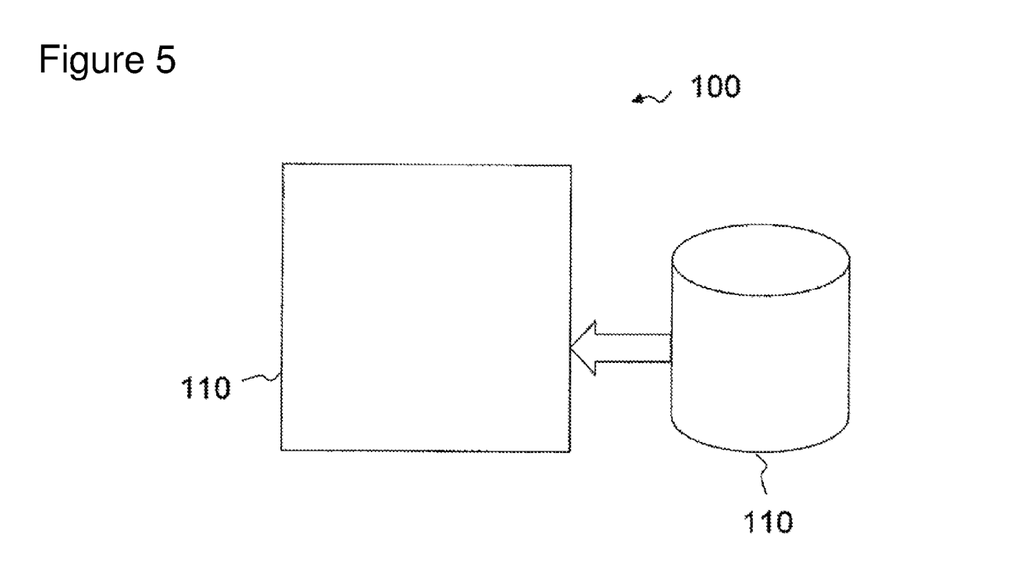
FIG. 5 is a block diagram of a system.

FIG. 5 shows a system including the storage unit and the apparatus for determining the route. The storage unit stores the digital map data for the route network and/or the path network in the predefined area 20. The apparatus is coupled to the storage unit using signaling and is designed to read the digital map data from the storage unit. In this case, the digital map data include the respective nodes in the area 20 and the connections 24 between the respective nodes in the area 20. The digital map data also include the respective edge costs g for the respective connections 24 between the nodes. The digital map data also include a set of correction values k determined using the first program.

The system may be part of a navigation system for a vehicle and/or for persons and/or part of a driver assistance system and/or a mobile terminal, for example a smartphone, and/or a computer. The storage unit may include a database, in particular.

LIST OF REFERENCE SYMBOLS

20 Area
22 Graph
22a Current node
24 Connection
28 Starting node
30 Destination node
32 Special node in a starting tile
34 Special node in a reference tile
40 Tile
100 System
110 Apparatus
120 Storage unit
g Edge costs
h Destination-node-based heuristic value
k' Destination-node-based correction value
k Correction value
Cost Cost ratio
f Total costs
S10, . . . , S18 Program steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining for at least one of a navigation system and a driver assistance system with an associated storage unit in a vehicle for storing digital map data, the route being determined based on correction values for a route calculation algorithm based on the digital map data for a route network and a path network in a predefined area, the digital map data comprising:
respective nodes in the predefined area and connections between the respective nodes in the predefined area, and
respective edge costs for the respective connections between the nodes,
the method comprising the acts of:
subdividing the predefined area, in a predefined manner, into a plurality of tiles, for which the correction values are determined,
determining one of the tiles in the area respectively as a starting tile and the respective remaining tiles as reference tiles, first special nodes being predefined, which first special nodes are arranged in the starting tile and form a true or artificial subset of all nodes in the starting tile, and second special nodes being predefined, which second special nodes are arranged in the respective reference tile and form a true or artificial subset of all nodes in the respective reference tile,
determining the correction value for the respective starting tile with respect to one of the reference tiles in each case in such a manner that:
a cost ratio is respectively determined for each first special node in the respective starting tile with respect to each second special node in the respective reference tile based on: (i) the edge costs of the connections, which lie between the respective first special node in the starting tile and the respective second special node in the respective reference tile and represent an optimum route between the first respective special node in the starting tile and the respective second special node in the respective reference tile, and (ii) a heuristic value for the respective first special node in the starting tile with respect to the respective second special node in the respective reference tile,
a mean value is determined based on the determined cost ratios, and
the correction value for the starting tile is determined with respect to the respective reference tile based on the mean value,
determining the route from a predefined starting node to a predefined destination node based on a predefined route criterion and based on the digital map data stored in the storage unit such that, for a possible expansion of a respective current node, total costs are determined for the current node based on a sum of edge costs of an optimum route from the starting node to the current node and a destination-node-based heuristic value for the current node, which represents respectively estimated costs from the current node to the destination node, and a destination-node-based correction value for the current node, which is selected from the set of correction values based on the current node and the destination node, and
forwarding the determined route to the at least one of the navigation system and the driver assistance system, and
controlling a predefined vehicle function based on the determined route.

2. The method according to claim 1, wherein
the digital map data comprise the respective positions of the nodes in the area, and the method further comprises the act of:
determining the heuristic value for the respective first special node in the starting tile with respect to the respective second special node in the reference tile based on the position of the respective first special node in the starting tile and the position of the respective second special node in the reference tile.

3. The method according to claim 1, wherein
the digital map data comprise predefined heuristic values for the respective nodes with respect to respective other nodes in the area, which each represent estimated costs from one node in each case to the other node in each case, and the heuristic value for the first respective special node in the starting tile with respect to the respective second special node in the reference tile is therefore predefined.

4. The method according to claim 1, wherein
the heuristic value for the respective first special node in the starting tile with respect to the respective second special node in the reference tile represents a Euclidean distance between the respective first special node in the starting tile and the respective second special node in the reference tile.

5. The method according to claim 1, wherein
the mean value of the cost ratios represents an arithmetic mean value of the cost ratios.

6. The method according to claim 1, wherein
the digital map data comprise the respective positions of the nodes in the predefined area, and the destination-node-based heuristic value is determined based on the position of the current node and the position of the destination node.

7. The method according to claim 1, wherein
the digital map data comprise predefined heuristic values for the respective nodes with respect to the respective other nodes in the predefined area, which each represent estimated costs from one node in each case to the other node in each case, and the destination-node-based heuristic value is therefore predefined.

8. The method according to claim 6, wherein
the digital map data comprise predefined heuristic values for the respective nodes with respect to the respective other nodes in the predefined area, which each represent estimated costs from one node in each case to the other node in each case, and the destination-node-based heuristic value is therefore predefined.

9. The method according to claim 1, wherein
the respective destination-node-based heuristic value represents a Euclidean distance between the current node and the destination node.

10. A system, comprising:
a storage unit that stores digital map data for at least one of a route network and a path network in a predefined area, the digital map data comprising:
respective nodes in the predefined area and connections between the respective nodes in the predefined area,
respective edge costs for the respective connections between the nodes in the predefined area, and
a set of correction values, wherein the correction values are determined via a processor executing a program to:
(i) subdivide the predefined area, in a predefined manner, into a plurality of tiles, for which the correction values are determined,
(ii) determine one of the tiles in the area respectively as a starting tile and the respective remaining tiles as reference tiles, first special nodes being predefined, which first special nodes are arranged in the starting tile and form a true or artificial subset of all nodes in the starting tile, and second special nodes being predefined, which second special nodes are arranged in the respective reference tile and form a true or artificial subset of all nodes in the respective reference tile,
(iii) determine the correction value for the respective starting tile with respect to one of the references tiles in each case in such a manner that:
a cost ratio is respectively determined for each first special node in the respective starting tile with respect to each second special node in the respective reference tile based on: (i) the edge costs of the connections, which lie between the respective first special node in the starting tile and the respective second special node in the respective reference tile and represent an optimum route between the respective first special node in the starting tile and the respective second special node in the respective reference tile, and (ii) a heuristic value for the respective first special node in the starting tile with respect to the respective second special node in the respective reference tile,
a mean value is determined based on the determined cost ratios, and
the correction value for the starting tile is determined with respect to the respective reference tile based on the mean value; and
an apparatus for determining a route for a navigation system and a driver assistance system, the apparatus being coupled to the storage unit and being configured to read the digital map data from the storage unit to determine the route by executing a program to:
determine the route from a predefined starting node to a predefined destination node based on a predefined route criterion and based on the digital map data stored in the storage unit such that, for a possible expansion of a respective current node, total costs are determined for the current node based on a sum of edge costs of an optimum route from the starting node to the current node and a destination-node-based heuristic value for the current node, which represents respectively estimated costs from the current node to the destination node, and a destination-node-based correction value for the current node, which is selected from the set of correction values based on the current node and the destination node,
forward the determined route to the at least one of the navigation system and the driver assistance system, and
control a predefined vehicle function based on the determined route.

\* \* \* \* \*